US005616900A

United States Patent [19]

Seewoster

[11] Patent Number: 5,616,900

[45] Date of Patent: Apr. 1, 1997

[54] ATM KEYPAD OPERATING DEVICE

[76] Inventor: O. Ben Seewoster, 23131 Cherry Ave., Lake Forest, Calif. 92630

[21] Appl. No.: 502,382

[22] Filed: Jul. 14, 1995

[51] Int. Cl.[6] .......... G06F 17/60

[52] U.S. Cl. .......... 235/379; 902/20; 341/34

[58] Field of Search .......... 902/5, 20; 235/379, 235/380; 341/22, 34; 200/5 A, 330, 332.1, 341

[56] References Cited

U.S. PATENT DOCUMENTS

| | | | |
|---|---|---|---|
| 2,407,411 | 9/1946 | Folis | 341/34 X |
| 3,179,396 | 4/1965 | Bracken | 200/330 |
| 3,770,553 | 12/1973 | Rackman | 379/97 |
| 4,135,074 | 1/1979 | Malacheski | 200/330 |
| 4,234,932 | 11/1980 | Gorgens | 364/900 |
| 4,453,074 | 6/1984 | Weinstein | 235/380 |
| 4,578,567 | 3/1986 | Granzow et al. | 235/380 |
| 4,962,601 | 9/1987 | Nakano | 235/380 |
| 5,276,729 | 6/1994 | Higuchi et al. | 379/58 |
| 5,321,242 | 6/1994 | Heath, Jr. | 235/382 |

*Primary Examiner*—Donald T. Hajec
*Assistant Examiner*—Jeffrey R. Filipek

[57] ABSTRACT

A device for entering a code into a keypad of an ATM. The inventive device includes a housing positionable over an ATM keypad. A plurality of solenoids are mounted to a lower surface of the housing for actuating individual keys of the ATM keypad. A code entering keypad is mounted to an upper surface of the housing for entering a PIN number into a controller such that a code can be entered into the device within the privacy of a vehicle and subsequently transferred to the ATM key pad of a visible ATM machine.

6 Claims, 3 Drawing Sheets

ATM KEYPAD OPERATING DEVICE

BACKGROUND OF THE INVENTION

1. Field of the Invention

The present invention relates to automatic data entering devices and more particularly pertains to an ATM keypad operating device for entering a code into a keypad of an ATM.

2. Description of the Prior Art

The use of automatic data entering devices is known in the prior art. More specifically, automatic data entering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art automatic data entering devices include U.S. Pat. No. 4,234,932; U.S. Pat. No. 4,578,567; U.S. Pat. No. 5,321,242; U.S. Pat. No. 4,453,074; and U.S. Pat. No. 5,276,729.

While these devices fulfill their respective, particular objectives and requirements, the aforementioned patents do not disclose an ATM keypad operating device for entering a code into a keypad of an ATM which includes a housing positionable over the ATM keypad, a plurality of solenoids mounted to a lower surface of the housing for actuating individual keys of the ATM keypad, and a code entering keypad mounted to an upper surface of the housing for entering a PIN number into a controller of the device such that a code can be entered within the privacy of a vehicle and subsequently transferred to the ATM keypad of visible ATM machine.

In these respects, the ATM keypad operating device according to the present invention substantially departs from the conventional concepts and designs of the prior art, and in so doing provides an apparatus primarily developed for the purpose of entering a code into a keypad of an ATM machine.

SUMMARY OF THE INVENTION

In view of the foregoing disadvantages inherent in the known types of automatic data entering devices now present in the prior art, the present invention provides a new ATM keypad operating device construction wherein the same can be utilized for entering a code into a keypad of a telephone or ATM machine. As such, the general purpose of the present invention, which will be described subsequently in greater detail, is to provide a new ATM keypad operating device apparatus and method which has many of the advantages of the automatic data entering devices mentioned heretofore and many novel features that result in an ATM keypad operating device which is not anticipated, rendered obvious, suggested, or even implied by any of the prior art automatic data entering devices, either alone or in any combination thereof.

To attain this, the present invention generally comprises a device for entering a code into a keypad of an ATM. The inventive device includes a housing positionable over an ATM keypad. A plurality of solenoids are mounted to a lower surface of the housing for actuating individual keys of the ATM keypad. A code entering keypad is mounted to an upper surface of the housing for entering a PIN number into a controller such that a code can be entered into the device within the privacy of a vehicle and subsequently transferred to the ATM key pad of a visible ATM machine.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ATM keypad operating device apparatus and method which has many of the advantages of the automatic data entering devices mentioned heretofore and many novel features that result in an ATM keypad operating device which is not anticipated, rendered obvious, suggested, or even implied by any of the prior art tool guides, either alone or in any combination thereof.

It is another object of the present invention to provide a new ATM keypad operating device which may be easily and efficiently manufactured and marketed.

It is a further object of the present invention to provide a new ATM keypad operating device which is of a durable and reliable construction.

An even further object of the present invention is to provide a new ATM keypad operating device which is susceptible of a low cost of manufacture with regard to both materials and labor, and which accordingly is then susceptible of low prices of sale to the consuming public, thereby making such ATM keypad operating devices economically available to the buying public.

Still yet another object of the present invention is to provide a new ATM keypad operating device which provides in the apparatuses and methods of the prior art some of the advantages thereof, while simultaneously overcoming some of the disadvantages normally associated therewith.

Still another object of the present invention is to provide a new ATM keypad operating device for entering a code into a keypad of a telephone or an ATM machine.

Yet another object of the present invention is to provide a new ATM keypad operating device which includes a housing positionable over the ATM keypad, a plurality of solenoids mounted to a lower surface of the housing for actuating individual keys of the ATM keypad, and a code entering keypad mounted to an upper surface of the housing for entering a PIN number into a controller of the device such that a code can be entered within the privacy of a vehicle and subsequently transferred to the ATM keypad of visible ATM machine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
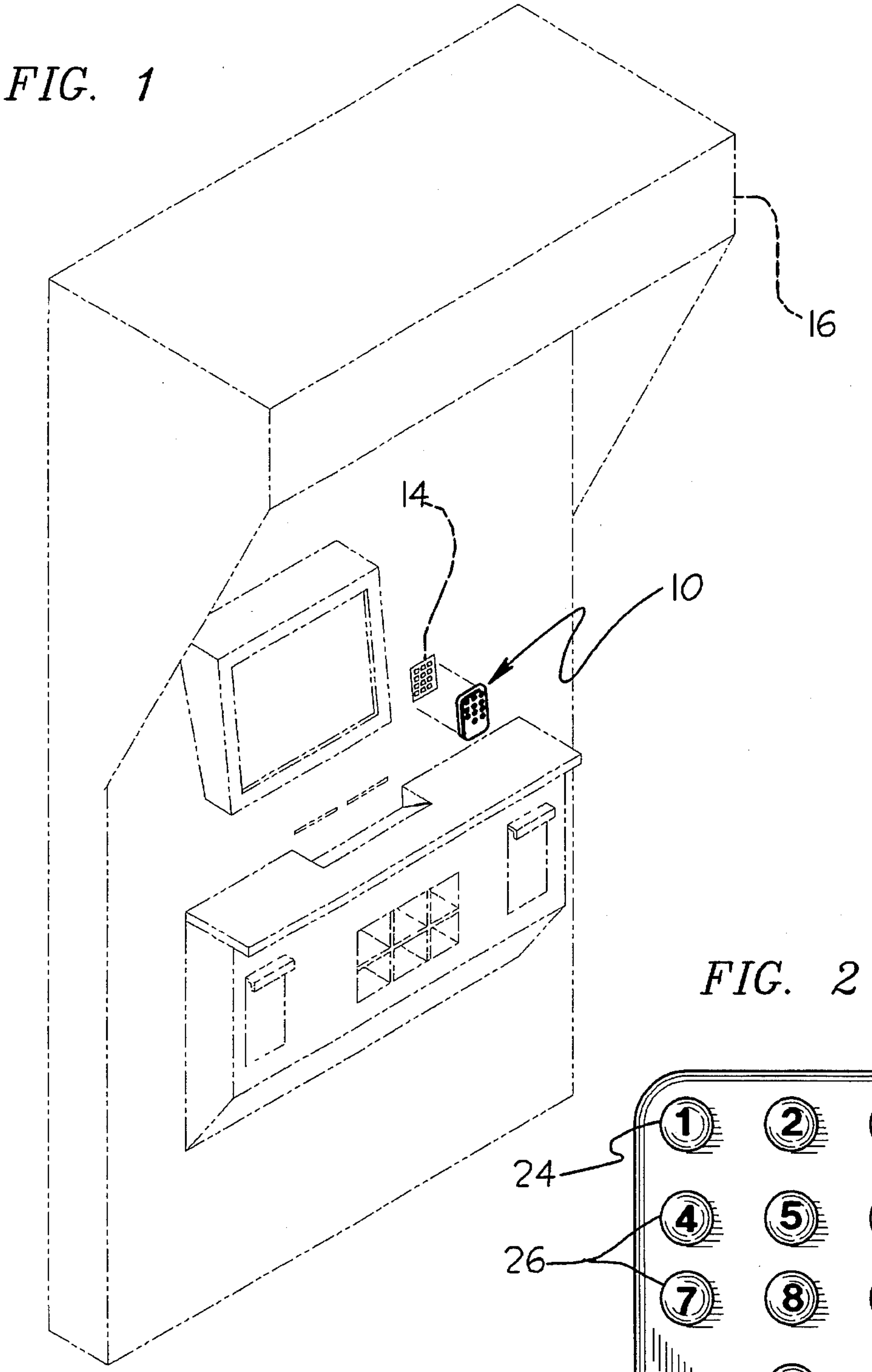
FIG. 1 is an isometric illustration of an ATM keypad operating device according to the present invention in use.
Figure 2:
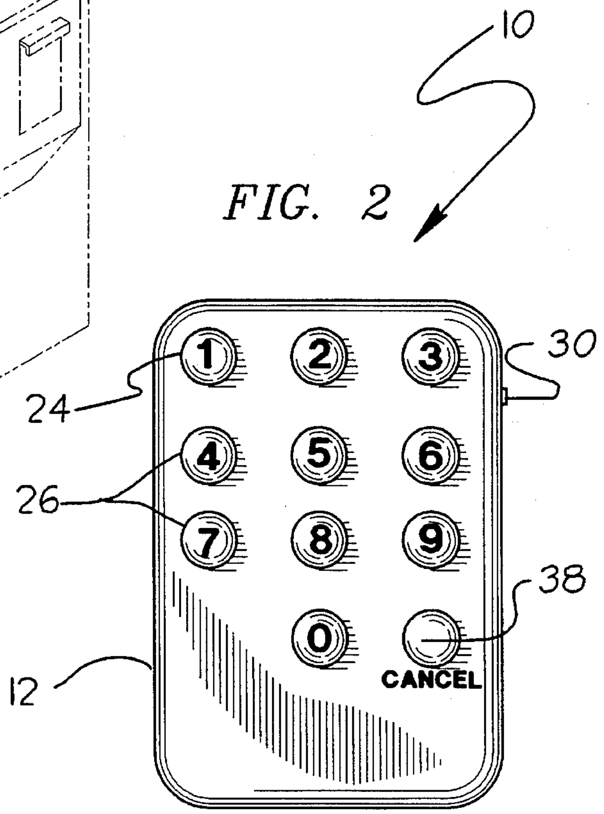
FIG. 2 is a front elevation view of the invention, per se.
Figure 3:
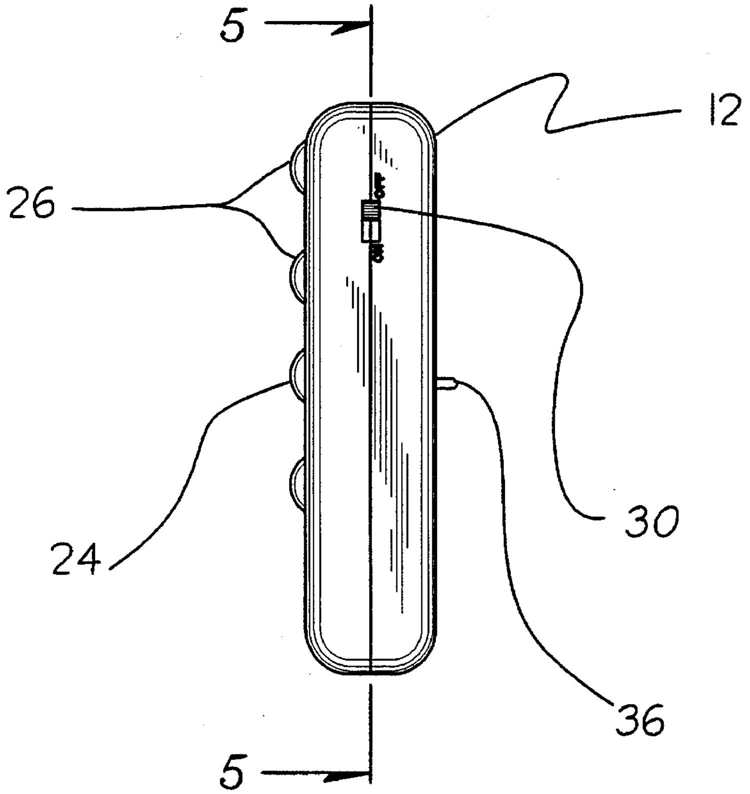
FIG. 3 is a side elevation view thereof.

With reference now to the drawings, and in particular to FIGS. 1–7 thereof, a new ATM keypad operating device embodying the principles and concepts of the present invention and generally designated by the reference numeral 10 will be described.

Figure 4:
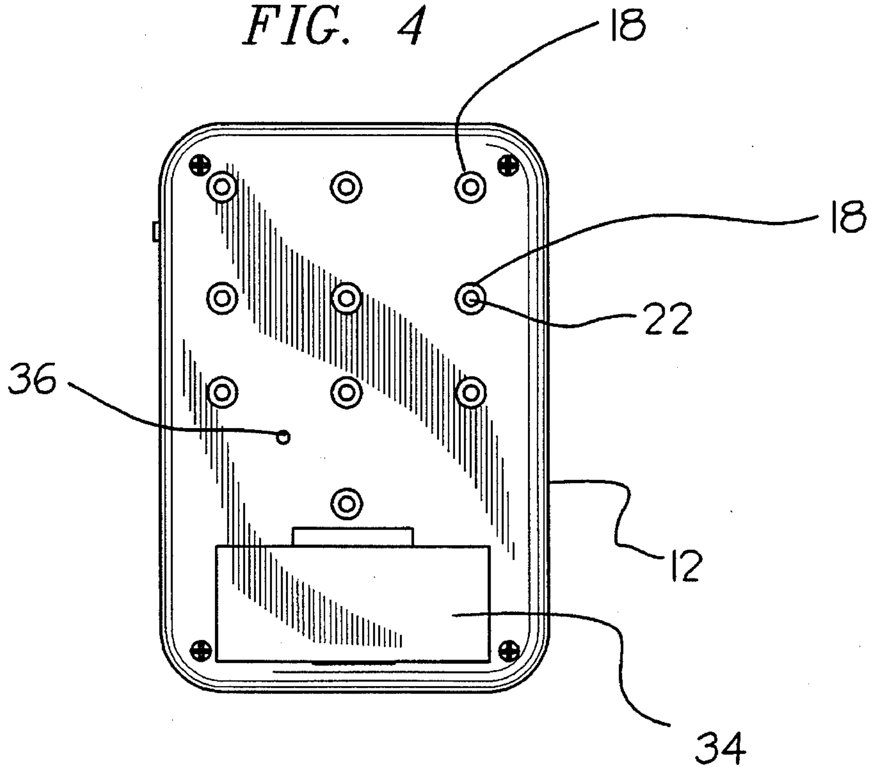
FIG. 4 is a rear elevation view of the invention.
Figure 6:
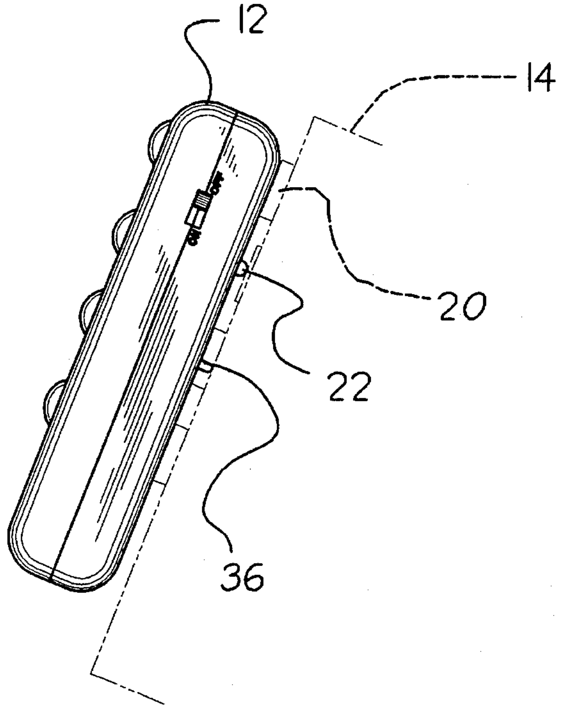
FIG. 6 is a side elevation view of the present invention in use.

More specifically, it will be noted that the ATM keypad operating device 10 comprises a portable housing 12 which can be placed over or against an ATM keypad 14 of an ATM or automatic teller machine 16 such as is shown in FIG. 1 of the drawings. As shown in FIGS. 4 and 6, a plurality of solenoids 18 are mounted to a rear surface of the portable housing 12 and are each positioned for engagement with an individual key 20 of the ATM keypad 14. Each of the solenoids 18 includes a movable projector 22 which engages a respective key 20 of the ATM keypad 14 during use of the device 10 as shown in FIG. 6. A code entering keypad means 24 is mounted to a front surface of the portable housing 12 and includes a plurality of separate keys 26 which can be operated for entering a PIN number or code into a controller 28 electrically coupled thereto. By this structure, an individual can enter a secret code or PIN number into the controller 28 within the privacy of a vehicle or like enclosure and subsequently transfer the PIN number to an ATM keypad 14 of an ATM machine 16 by placing the portable housing 12 against the ATM keypad 14 to allow the projectors 22 of the solenoids 18 to operate the keys 20 in a manner which regenerates and enters the code into the ATM keypad.

Figure 5:
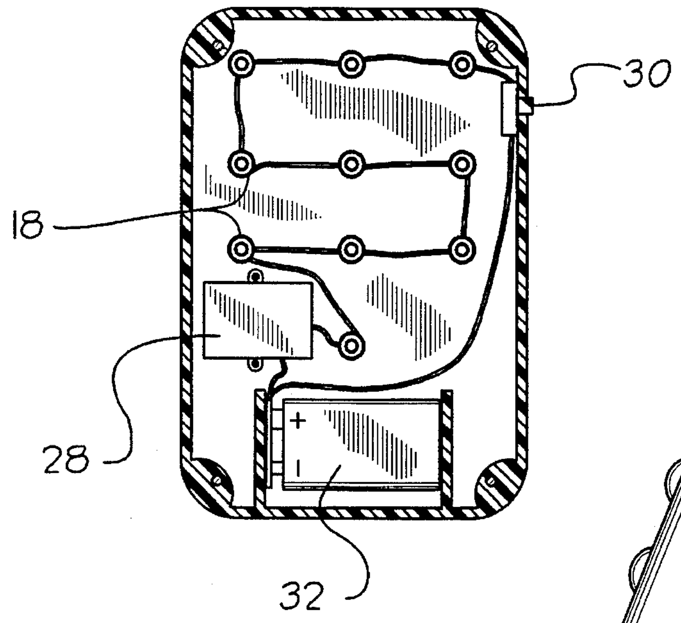
FIG. 5 is a cross-sectional view taken along line 5—5 of FIG. 3.

As shown in FIGS. 2 through 6, the portable housing 12 includes a master power switch 30 projecting exteriorly of the portable housing 12. The master power switch 30 is electrically interposed between a battery 32 and the controller 28 such as is illustrated in FIG. 5 of the drawings. The battery 32 is removably contained within the portable housing 12 beneath a battery cover 34 extending over an aperture directed through the rear surface of the housing 12 as shown in FIG. 4.

Figure 7:
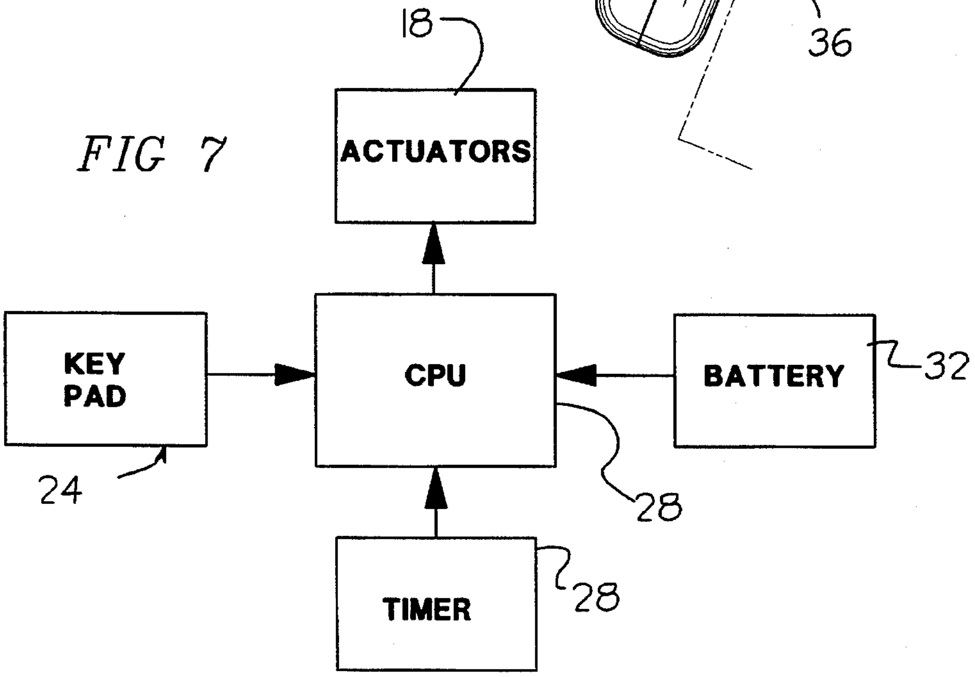
FIG. 7 is a block diagram illustration of the present invention.

The controller 28 of the present invention 10 includes a CPU, as shown in FIG. 7, which stores the code in electronic memory as entered through the code entering keypad means 24. The controller 28 further includes a timer which retains the code within memory for only a predetermined amount of time preferably equal to approximately sixty or ninety seconds. To initiate entering of the code stored within the controller 28 into the ATM keypad 14 through the solenoids 18, an actuator switch 36 is contained within the controller 28 and projects through the rear surface of the portable housing 12 for engagement with a portion of the ATM machine 16. Thus, a code or PIN number can entered into the code entering keypad means 24 through a depression of the separate keys 26 for storage within the controller 28, whereby a positioning of the portable housing 12 against the ATM keypad 14 will depress the actuator switch 36 to initiate sequential operation of the solenoids 18 in a manner which enters the PIN number into the keys 20 of the ATM keypad 14. Should a predetermined amount of time elapse between an entering of the PIN number into the code entering keypad means 24 and a positioning of the portable housing 12 against the ATM keypad 14 depressing the actuator switch 36, the PIN number shall be erased from memory within the CPU 28. Further, the present invention 10 may include a cancel button 38 mounted to an exterior of the portable housing 12 and positioned in electrical communication with the CPU 28 which can be utilized to erase an entered PIN number or code from a memory of the CPU. Thus, the cancel button 38 can be utilized in an emergency to preclude unauthorized persons from utilizing the code stored within the CPU, or alternatively may be utilized to correct a mistake made in entering the PIN number or code.

In use, the ATM keypad operating device 10 of the present invention can be easily utilized for storing a PIN number or code and subsequently entering the code into a keypad of an ATM machine 16 in a manner which precludes visual observation of the PIN number or code. The present invention 10 is not intended to be limited to use with ATM machines 16, but instead can be utilized with other devices having a keypad entering means such as a telephone or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. An ATM keypad operating device comprising:

a portable housing which can be placed over and against a numerical keypad of a machine, the keypad having a plurality of keys;

a plurality of solenoids mounted to a rear surface of the portable housing and each positioned for engagement with an individual one of the keys of the keypad, each of the solenoids including a movable projector positioned for engagement with a respective key of the keypad;

a code entering means mounted to the portable housing for receiving a code;

a controller electrically coupled to the code entering means, the controller being further electrically coupled to the solenoids, wherein a code can be entered into the controller through the code entering means and subsequently transferred to the keypad of the machine by the movable projectors of the solenoids.

2. The ATM keypad operating device of claim 1, wherein the controller includes a CPU which stores a code in memory as entered through the code entering means.

3. The ATM keypad operating device of claim 2, and further comprising an actuator switch electrically coupled to the CPU of the controller and projecting through the rear surface of the portable housing for engagement with a portion of the machine, whereby a positioning of the portable housing against the keypad of the machine will depress the actuator switch to initiate sequential operation of the solenoids in a manner which enters the code through the keys of the keypad.

4. The ATM keypad operating device of claim 3, wherein the controller further includes a timer which retains the code within memory for only a predetermined amount of time, wherein should the predetermined amount of time elapse between an entering of the code into the code entering means and a positioning of the portable housing against the keypad depressing the actuator switch, the code will be erased from memory within the CPU.

5. The ATM keypad operating device of claim 4, and further comprising a cancel button mounted to an exterior of the portable housing and positioned in electrical communication with the CPU which can be utilized to erase an entered code from memory of the CPU.

6. A method of entering a code into a machine comprising the steps of:

providing an ATM keypad operating device comprising a portable housing which can be placed over and against a numerical keypad of a machine, the keypad having a plurality of keys; a plurality of solenoids mounted to a rear surface of the portable housing and each positioned for engagement with an individual one of the keys of the keypad, each of the solenoids including a movable projector positioned for engagement with a respective key of the keypad; a code entering means mounted to the portable housing for receiving a code; and a controller electrically coupled to the code entering means, the controller being further electrically coupled to the solenoids, wherein a code can be entered into the controller through the code entering means and subsequently transferred to the keypad of the machine by the movable projectors of the solenoids;

entering a code into the controller through the code entering means;

positioning the portable housing over the keypad of a machine, thereby causing the solenoids to sequentially operate and enter the code into the keypad.

* * * * *